(12) United States Patent
Takahashi

(10) Patent No.: US 10,871,668 B2
(45) Date of Patent: Dec. 22, 2020

(54) LIGHT CONTROL DEVICE

(71) Applicant: TOPPAN PRINTING CO., LTD., Tokyo (JP)

(72) Inventor: Hiroshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/704,526

(22) Filed: Dec. 5, 2019

(65) Prior Publication Data

US 2020/0110297 A1 Apr. 9, 2020

Related U.S. Application Data

(63) Continuation of application No. PCT/JP2018/021054, filed on May 31, 2018.

(30) Foreign Application Priority Data

Jun. 8, 2017 (JP) ................... 2017-113443

(51) Int. Cl.
*G02F 1/133* (2006.01)
*G02F 1/1334* (2006.01)
(Continued)

(52) U.S. Cl.
CPC .......... *G02F 1/13306* (2013.01); *G02F 1/139* (2013.01); *G02F 1/1334* (2013.01); *G02F 1/1345* (2013.01); *G02F 1/13439* (2013.01); *G02F 1/1339* (2013.01); *G02F 2001/13706* (2013.01); *G02F 2001/13756* (2013.01)

(58) Field of Classification Search
CPC .................................................. G02F 1/13306
See application file for complete search history.

(56) References Cited

U.S. PATENT DOCUMENTS

2004/0246224 A1 12/2004 Tsai et al.
2007/0008262 A1* 1/2007 Harada .................... G09G 3/36
345/87

FOREIGN PATENT DOCUMENTS

JP 64-49924 3/1989
JP 2013-72895 4/2013
(Continued)

OTHER PUBLICATIONS

International Search Report dated Aug. 14, 2018, in corresponding International Patent Application No. PCT/JP2018/021054.
(Continued)

*Primary Examiner* — Sang V Nguyen

(57) ABSTRACT

A light control device includes: a light control element including first and second base members, first and second electrodes, a liquid crystal layer, and first and second terminals electrically connected to the first and second electrodes; and a drive circuit that applies a first drive voltage to the first terminal and applies a second drive voltage having a polarity different from that of the first drive voltage to the second terminal. The first drive voltage is set to a first voltage in a first period, is set to a second voltage lower than the first voltage in a second period, is set to a third voltage lower than the second voltage in a third period, and is set to a fourth voltage lower than the second voltage and higher than the third voltage in a fourth period.

8 Claims, 13 Drawing Sheets

(51) Int. Cl.
    *G02F 1/1343*    (2006.01)
    *G02F 1/1345*    (2006.01)
    *G02F 1/139*    (2006.01)
    *G02F 1/1339*    (2006.01)
    *G02F 1/137*    (2006.01)

(56) References Cited

FOREIGN PATENT DOCUMENTS

| WO | WO2018178043 | * | 4/2018 | ............ G02F 1/133 |
| WO | WO 2018178043 | * | 10/2018 | |

OTHER PUBLICATIONS

Written Opinion of the International Searching Authority dated Aug. 14, 2018, in corresponding International Patent Application No. PCT/JP2018/021054.
Extended European Search Report dated May 11, 2020 in corresponding European Patent Application No. 18812822.7.
English Translation by WIPO of the International Preliminary Report on Patentability dated Dec. 19, 2019 in corresponding International Patent Application No. PCT/JP2018/021054.

* cited by examiner

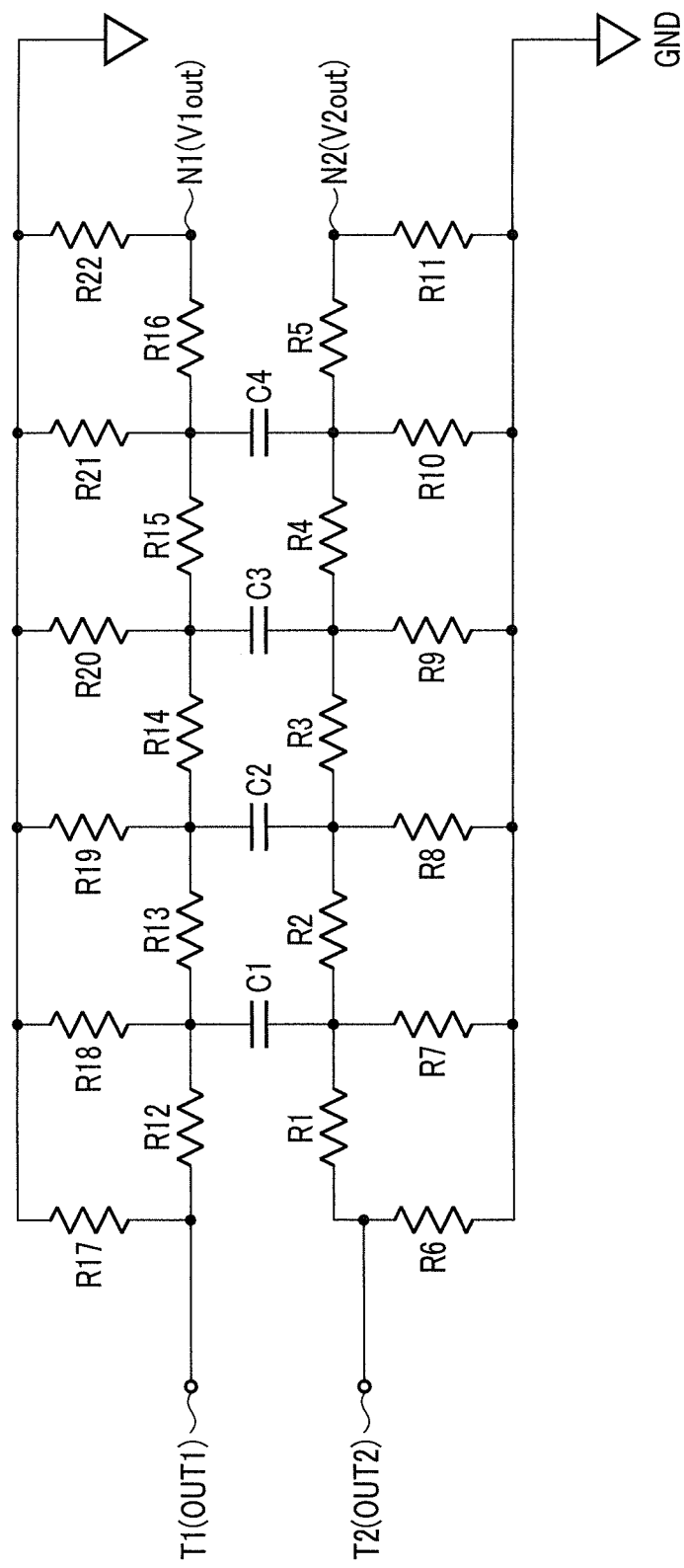
F I G. 5

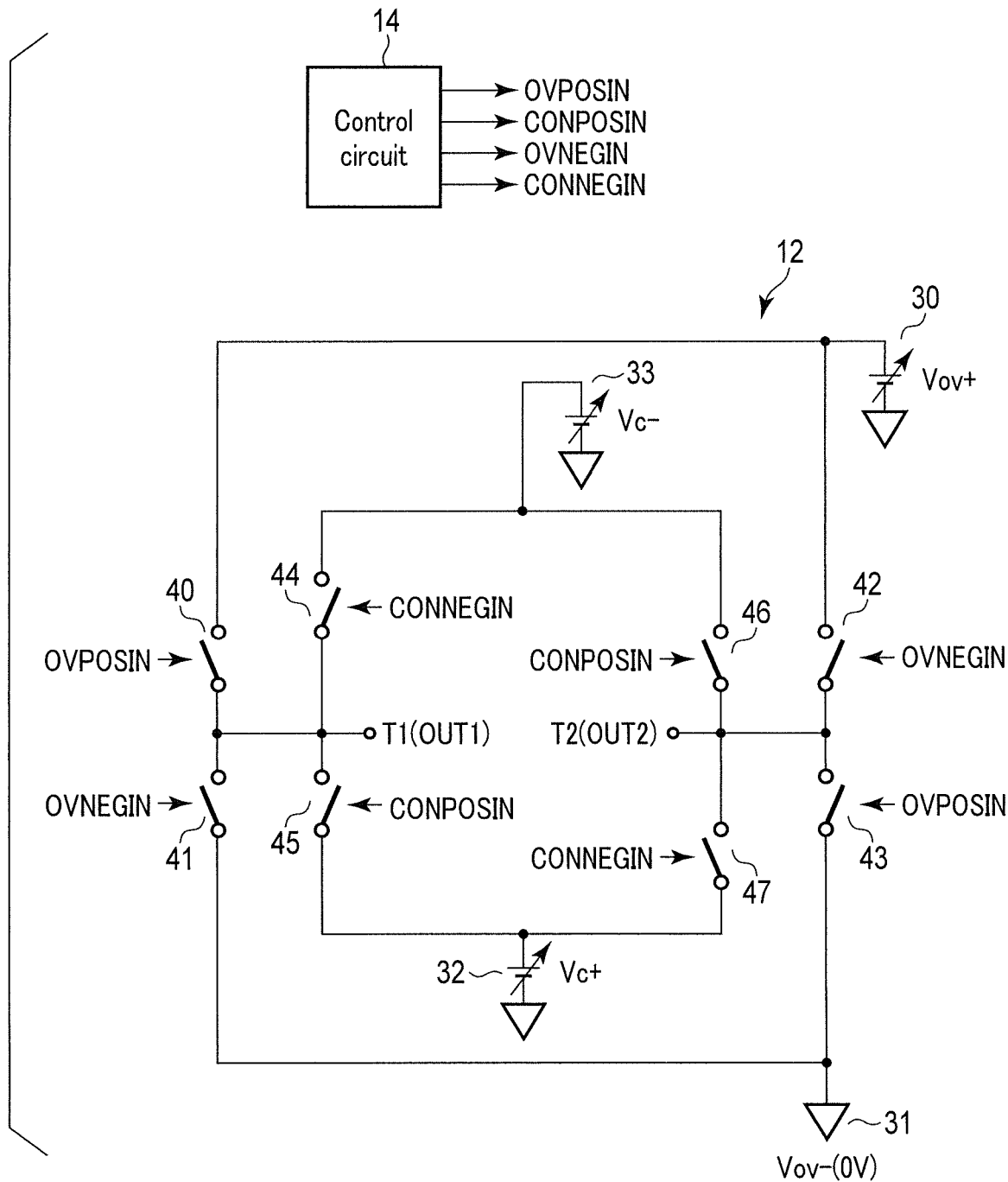
F I G. 6

LIGHT CONTROL DEVICE

CROSS-REFERENCE TO RELATED APPLICATIONS

This application is a Continuation Application of PCT Application No. PCT/JP2018/021054, filed May 31, 2018, and based upon and claiming the benefit of priority from Japanese Patent Application No. 2017-113443, filed Jun. 8, 2017, the entire contents of all of which are incorporated herein by reference.

FIELD

The present invention generally relates to a light control device using a liquid crystal.

BACKGROUND

There is known a light control element using a polymer dispersed liquid crystal or a polymer network liquid crystal capable of performing bright display without necessarily requiring alignment processing and with no need for a polarizing plate. A liquid crystal layer (light control layer) includes a liquid crystal material and a polymer material. The ordinary light refractive index of the liquid crystal material and the refractive index of the polymer material are set to be approximately the same.

For example, the light control element is in a scattering state when no voltage is applied to the liquid crystal layer, and is in a transmission state when a voltage is applied to the liquid crystal layer. For example, the driving of the light control element uses pulse driving in order to increase the driving efficiency with respect to the applied voltage.

When the light control element is used in a home or office, DC power is generated from a commercial power source using an AC/DC converter or the like, and pulse driving is performed using the DC power and a switching element. When the light control element is used in an automobile or the like, a required voltage is obtained by a DC/DC converter or the like from DC power fed from a secondary battery power source such as a battery, and pulse driving is performed thereafter.

Where the light control element is fixed to a building, etc., or is installed on a car window, etc., it is required that the terminal portions to which power is applied be arranged on one side of the light control element, so as to suitably mount the light control element on the building or window. However, in a portion of the light control element having a planar shape that is away from the terminal portions, a voltage drop occurs due to the resistance component and the capacitance component of the light control element. For this reason, even if a maximum voltage equal to or lower than the withstand voltage is applied to the terminal portions, the voltage applied to the opposite distal-side portions cannot reach the threshold voltage for driving the liquid crystal, and a sufficient transmission mode is not achieved.

Also, in order to reduce the influence of the voltage drop that occurs at the distal-side portions of the light control element due to the capacitance component, the drive frequency may be lowered and the application of the same polarity voltage may have to be continued until the voltage applied to the distal-side portions increases. However, since the time until the voltage applied to the distal-side portions rises is inevitably long, flicker becomes conspicuous in the vicinity of the distal-side portions.

SUMMARY

According to a first aspect of the present invention, there is provided a light control device comprising:

a light control element including first and second base members, first and second electrodes respectively provided on the first and second base members, a liquid crystal layer filled between the first and second electrodes, and first and second terminals electrically connected to the first and second electrodes; and a drive circuit that applies a first drive voltage to the first terminal and applies a second drive voltage having a polarity different from that of the first drive voltage to the second terminal, wherein the first drive voltage is set to a first voltage in a first period, is set to a second voltage lower than the first voltage in a second period following the first period, is set to a third voltage lower than the second voltage in a third period following the second period, and is set to a fourth voltage lower than the second voltage and higher than the third voltage in a fourth period following the third period.

BRIEF DESCRIPTION OF THE DRAWINGS

FIG. 5 is an equivalent circuit diagram of the light control element.

FIG. 6 is a circuit diagram mainly showing a drive circuit.

DETAILED DESCRIPTION

A description will now be given of the embodiments with reference to the accompanying drawings. It should be noted that the drawings are schematic or conceptual, and the dimensions and scales of the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited by the element shapes, structures, arrangements, etc. described below. In the description below, structural elements having substantially the same functions and configurations will be denoted by the same reference symbols, and a repetitive description of such elements will be given only where necessary.

First Embodiment

[1] CONFIGURATION OF LIGHT CONTROL DEVICE 10

Figure 1:
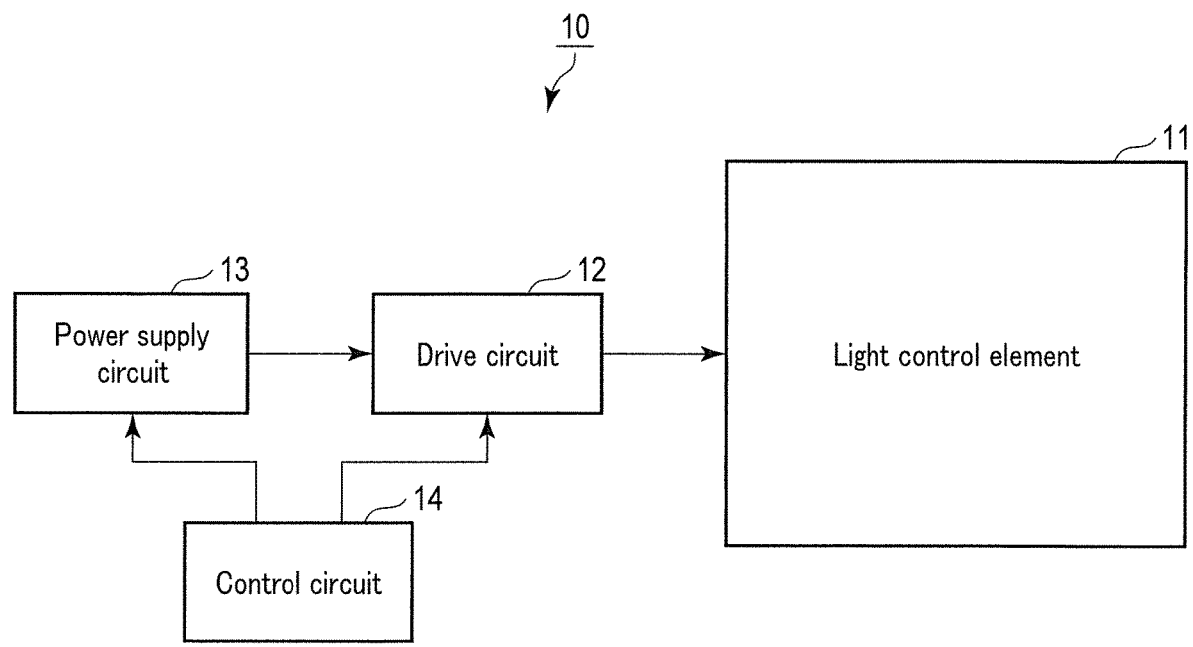
FIG. 1 is a block diagram of a light control device according to a first embodiment.

FIG. 1 is a block diagram of a light control device 10 according to the first embodiment of the present invention. The light control device 10 includes a light control element 11, a drive circuit 12, a power supply circuit 13 and a control circuit 14.

The light control element 11 is an element capable of controlling the light transmittance. The light control element 11 is made of, for example, a light control film. The light control film is a functional film capable of switching between transparency and opacity (white turbidity). For example, by applying a voltage (maximum voltage) to the light control film, the light control film can be set in a transparent state. On the other hand, by applying 0V (minimum voltage) to the light control film, the light control film is in a white turbidity state. Further, by applying an intermediate voltage between the maximum voltage and the minimum voltage to the light control film, gradation display can be performed stepwise between the transparency and the white turbidity. A specific configuration of the light control element 11 will be described later.

The drive circuit 12 applies a voltage (drive voltage) to the light control element 11 to drive the light control element 11. A circuit configuration of the drive circuit 12 will be described later.

The power supply circuit 13 receives a power (external power) from the outside. The external power is a commercial power, an AC voltage (AC power source), or a DC voltage (DC power source). The power supply circuit 13 generates voltages of a plurality of levels necessary for the operation of the light control element 11, using the external power. The voltage generated by the power supply circuit 13 is supplied to the drive circuit 12.

The control circuit 14 controls the drive circuit 12 and the power supply circuit 13. The control circuit 14 supplies control signals to the drive circuit 12 and the power supply circuit 13, so that the drive circuit 12 and the power supply circuit 13 can perform desired operations.

[1-1] Configuration of Light Control Element 11

Figure 2:
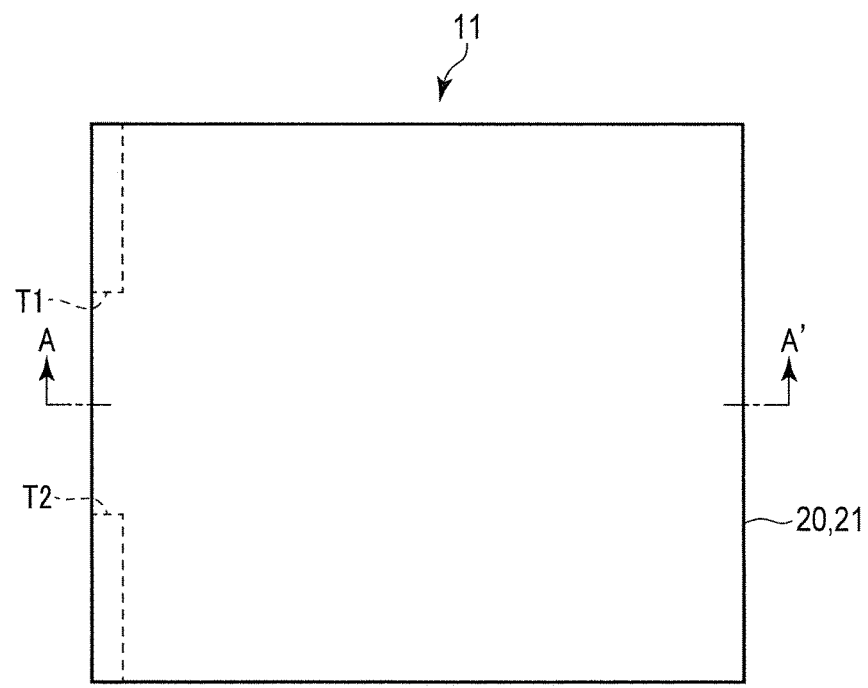
FIG. 2 is a plan view of a light control element.
Figure 3:
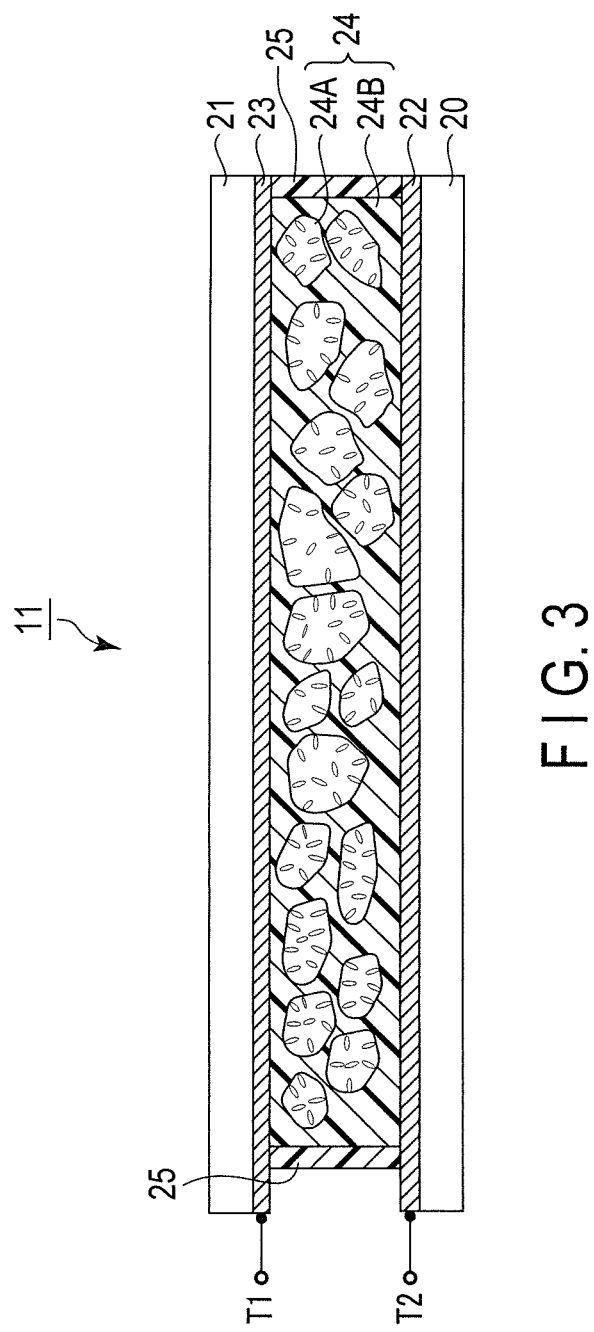
FIG. 3 is a sectional view of the light control element taken along line A-A' of FIG. 2.

Next, the configuration of the light control element 11 will be described. FIG. 2 is a plan view of the light control element 11. FIG. 3 is a cross sectional view taken along line A-A' of FIG. 2.

The light control element 11 can take a given planar shape, for example, a square. Where the light control element 11 is a light control film, the light control film is processed in accordance with the outline of a region to be attached.

The light control element 11 includes base members 20 and 21 disposed opposite to each other, and a liquid crystal layer (light control layer) 24 disposed between the base members 20 and 21. The base members 20 and 21 are made of a transparent member, for example, a transparent film. For example, a polyethylene terephthalate (PET) film, a polyethylene (PE) film, or a polycarbonate (PC) film can be used as the base members 20 and 21.

The liquid crystal layer 24 includes a liquid crystal material 24A and a polymer material 24B. The liquid crystal layer 24 is made of a polymer dispersed liquid crystal (PDLC) or a polymer network liquid crystal (PNLC). The polymer dispersed liquid crystal is composed of a complex in which a liquid crystal material is dispersed in a matrix made of a polymer material; that is, the polymer dispersed liquid crystal has a configuration in which the liquid crystal is phase-separated in the matrix. The polymer network liquid crystal is composed of a complex in which a liquid crystal material having a continuous phase is filled in a three-dimensional network structure (polymer network) made of a polymer material. As the polymer material, a photocurable resin can be used. For example, in PDLC, a solution in which a liquid crystal material is mixed with a photopolymerization type polymer precursor (monomer) is irradiated with ultraviolet light to polymerize the monomer, thereby forming a polymer, and the liquid crystal is dispersed in the matrix made of the aforementioned polymer.

Transparent electrode 22 is provided on base member 20 so as to be in contact with the liquid crystal layer 24. Transparent electrode 23 is provided on base member 21 so as to be in contact with the liquid crystal layer 24. The transparent electrodes 22 and 23 are made of a material having both light transparency and conductivity, and are made of, for example, ITO (indium tin oxide).

The light control element 11 includes a terminal T1 electrically connected to transparent electrode 23 and a terminal T2 electrically connected to transparent electrode 22. The terminals T1 and T2 are arranged together, for example, on one side of the light control element 11. The terminals T1 and T2 are electrically connected to the drive circuit 12. The terminals T1 and T2 are made of metal (for example, gold, silver, copper or aluminum).

The liquid crystal layer 24 is sealed between the transparent electrodes 22 and 23 by a seal member 25. The seal member 25 is formed in such a manner as to surround the liquid crystal layer 24. The seal member 25 is made of, for example, a photocurable resin. Depending on the material of the liquid crystal layer 24, the seal member 25 is not necessarily required. For example, where the liquid crystal material 24A is sealed by the polymer material 24B of the liquid crystal layer 24, the seal member 25 is not necessarily required.

[1-2] Operation of Liquid Crystal Layer 24

Next, a broad operation of the liquid crystal layer (light control layer) 24 will be described.

In the liquid crystal layer 24, the ordinary light refractive index of the liquid crystal material and the refractive index of the polymer material are set to be approximately the same. As the liquid crystal material, for example, a positive (P-type) nematic liquid crystal having positive dielectric anisotropy is used.

First, the operation of the liquid crystal layer 24 in the off state will be described. The off state is a state in which the same voltage (for example, 0V) is applied to the transparent electrode 22 and the transparent electrode 23, and no electric field is applied to the liquid crystal layer 24. FIG. 3 shows a state of the liquid crystal layer 24 in the off state.

When no voltage (no electric field) is applied to the liquid crystal layer 24, liquid crystal molecules enter a random state with respect to the interface of the polymer matrix (or the polymer network). In this case, the refractive indexes of the liquid crystal material and the polymer matrix differ, thereby ensuring that incident light is scattered at the interface of the polymer matrix. That is, in a state in which the liquid crystal molecules are not aligned, the liquid crystal layer 24 is in a high haze state. At this time, the liquid crystal layer 24 is in a cloudy state, while the light control element 11 is in an opaque state. In this manner, the light control element 11 can shield an object from an observer. The haze value is an index related to the transparency of a member and represents the degree of haze. A smaller haze value indicates a higher transparency.

Figure 4:
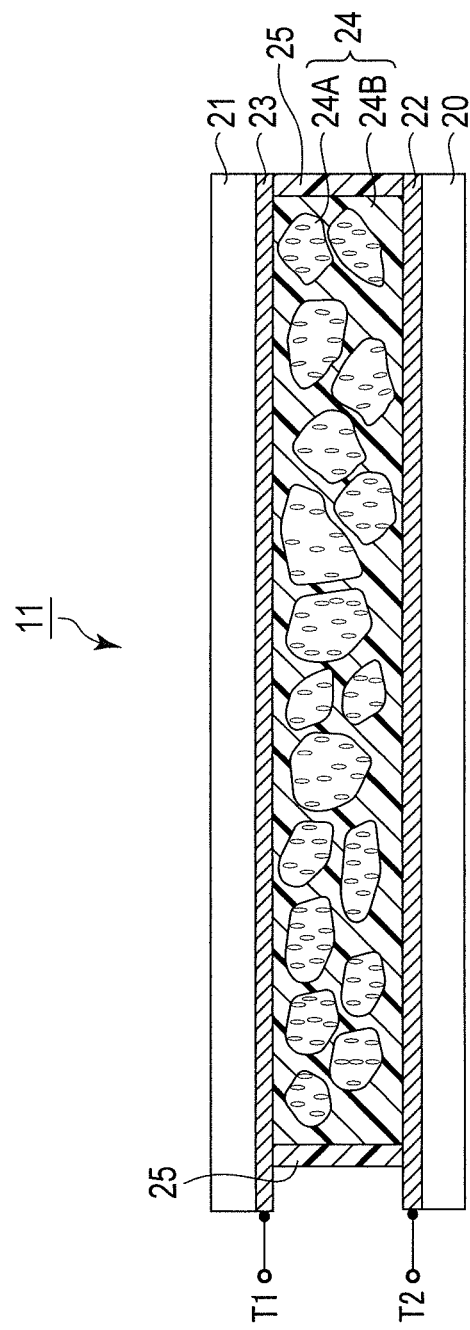
FIG. 4 is a cross-sectional view for explaining the alignment of a liquid crystal layer.

Next, the operation of the liquid crystal layer 24 in the on state will be described. The on state is a state in which different voltages (for example, 0V and a positive voltage) are applied to the transparent electrode 22 and the transparent electrode 23, and in which an electric field is applied to the liquid crystal layer 24. Note that an alternating voltage is applied to the transparent electrode 22 and the transparent electrode 23. FIG. 4 shows a state of the liquid crystal layer 24 in the on state.

When a voltage is applied to the liquid crystal layer 24, the major axes (directors) of the liquid crystal molecules align in a direction substantially perpendicular to the electrode planes. In this case, the refractive indexes of the liquid crystal material and the polymer matrix are substantially the same, so that the incident light is hardly scattered in the liquid crystal layer 24 and passes through the liquid crystal layer 24. That is, in a state in which the liquid crystal molecules are aligned, the liquid crystal layer 24 is in a low haze state. At this time, the light control element 11 is in a transparent state. Therefore, the observer can observe an object through the light control element 11.

This embodiment describes the case in which the light control element enters an opaque state when no voltage is applied and enters a transparent state when a voltage is applied. However, the present invention is not limited to this case. The present invention is also applicable to the case where the light control element 11 is a reverse type that enters a transparent state when no voltage is applied and that enters an opaque state when a voltage is applied.

[1-3] Equivalent Circuit of Light Control Element 11

Next, an equivalent circuit of the light control element 11 will be described. FIG. 5 is an equivalent circuit diagram of the light control element 11.

The transparent electrode 22 is formed in a planar shape. Therefore, the transparent electrode 22 constitutes a plurality of resistance components R1 to R11 so as to extend from a terminal side (a side on which the terminals T1 and T2 are arranged) to a distal side (a side opposite to the terminals T1 and T2).

Similarly, the transparent electrode 23 is formed in a planar shape. Therefore, the transparent electrode 23 constitutes a plurality of resistance components R12 to R22 so as to extend from the terminal side to the distal side.

The liquid crystal layer 24 constitutes a plurality of capacitance components C1 to C4 connected between transparent electrode 22 and transparent electrode 23.

As can be understood from FIG. 4, the voltage of the light control element 11 decreases from the terminal side to the terminal side, due to the voltage drop in the resistance components. That is, in the light control element 11, the voltage on the terminal side is high and the voltage on the distal side is low. The nodes on the distal side are denoted as N1 and N2.

[1-4] Configuration of Drive Circuit 12

Next, the configuration of the drive circuit 12 will be described. FIG. 6 is a circuit diagram mainly showing the drive circuit 12.

The control circuit 14 generates a signal OVPOSIN, a signal CONPOSIN, a signal OVNEGIN and a signal CONNEGIN, and sends these control signals to the drive circuit 12. The voltage waveforms of the signal OVPOSIN, signal CONPOSIN, signal OVNEGIN and signal CONNEGIN will be described later.

The power supply circuit 13 includes a positive side voltage source 30 for overdrive, a negative side voltage source 31 for overdrive, a voltage source 32 that generates a positive side control voltage for controlling the alignment of liquid crystal, and a voltage source 33 for generating a negative side control voltage. Voltage source 30 generates overdrive voltage Vov+. Voltage source 31 generates overdrive voltage Vov−. Voltage source 32 generates control voltage Vc+. Voltage source 33 generates control voltage Vc−. These voltages have a relationship expressed as "Vov+>Vc+>Vc−>Vov−".

Positive side control voltage Vc+ and negative side control voltage Vc− are voltages for controlling the alignment of the final liquid crystal, and are determined in accordance with the liquid crystal material used. That is, the voltage at which the liquid crystal molecules are vertically aligned (the threshold voltage of the liquid crystal) is determined in accordance with the liquid crystal material, and the voltage "(Vc+)−(Vc−)" is set equal to or slightly higher than the threshold voltage of the liquid crystal. The voltage "(Vov+)−(Vov−)" is set smaller than the withstand voltage of the liquid crystal. For example, Vov+=70V, Vov−=0V, Vc+=55V and Vc−=15V.

The drive circuit 12 includes switching elements 40-47. A first terminal of switching element 40 is connected to voltage source 30, a second terminal thereof is connected to terminal T1, and signal OVPOSIN is input to the control terminal. Switching element 40 is turned on when the signal OVPOSIN is at the high level (e.g., voltage Vdd=5V), and is turned off when the signal OVPOSIN is at the low level (e.g., ground voltage=0V).

A first terminal of switching element 41 is connected to voltage source 31, a second terminal thereof is connected to terminal T1, and signal OVNEGIN is input to the control terminal. Switching element 41 is turned on when the signal OVNEGIN is at the high level, and is turned off when the signal OVNEGIN is at the low level.

A first terminal of switching element 42 is connected to voltage source 30, a second terminal thereof is connected to terminal T2, and signal OVNEGIN is input to the control terminal. Switching element 42 is turned on when the signal OVNEGIN is at the high level, and is turned off when the signal OVNEGIN is at the low level.

A first terminal of switching element 43 is connected to voltage source 31, a second terminal thereof is connected to terminal T2, and signal OVPOSIN is input to the control terminal. Switching element 43 is turned on when the signal OVPOSIN is at the high level, and is turned off when the signal OVPOSIN is at the low level.

A first terminal of switching element 44 is connected to voltage source 33, a second terminal thereof is connected to the terminal T1, and signal CONNEGIN is input to the control terminal. Switching element 44 is turned on when the signal CONNEGIN is at the high level, and is turned off when the signal CONNEGIN is at the low level.

A first terminal of switching element 45 is connected to voltage source 32, a second terminal thereof is connected to terminal T1, and signal CONPOSIN is input to the control terminal. Switching element 45 is turned on when the signal CONPOSIN is at the high level, and is turned off when the signal CONPOSIN is at the low level.

A first terminal of switching element 46 is connected to voltage source 33, a second terminal thereof is connected to terminal T2, and signal CONPOSIN is input to the control terminal. Switching element 46 is turned on when the signal CONPOSIN is at the high level, and is turned off when the signal CONPOSIN is at the low level.

A first terminal of switching element 47 is connected to voltage source 32, a second terminal thereof is connected to terminal T2, and signal CONNEGIN is input to the control terminal. Switching element 47 is turned on when the signal CONNEGIN is at the high level, and is turned off when the signal CONNEGIN is at the low level.

[2] OPERATION OF LIGHT CONTROL DEVICE 10

Figure 7:
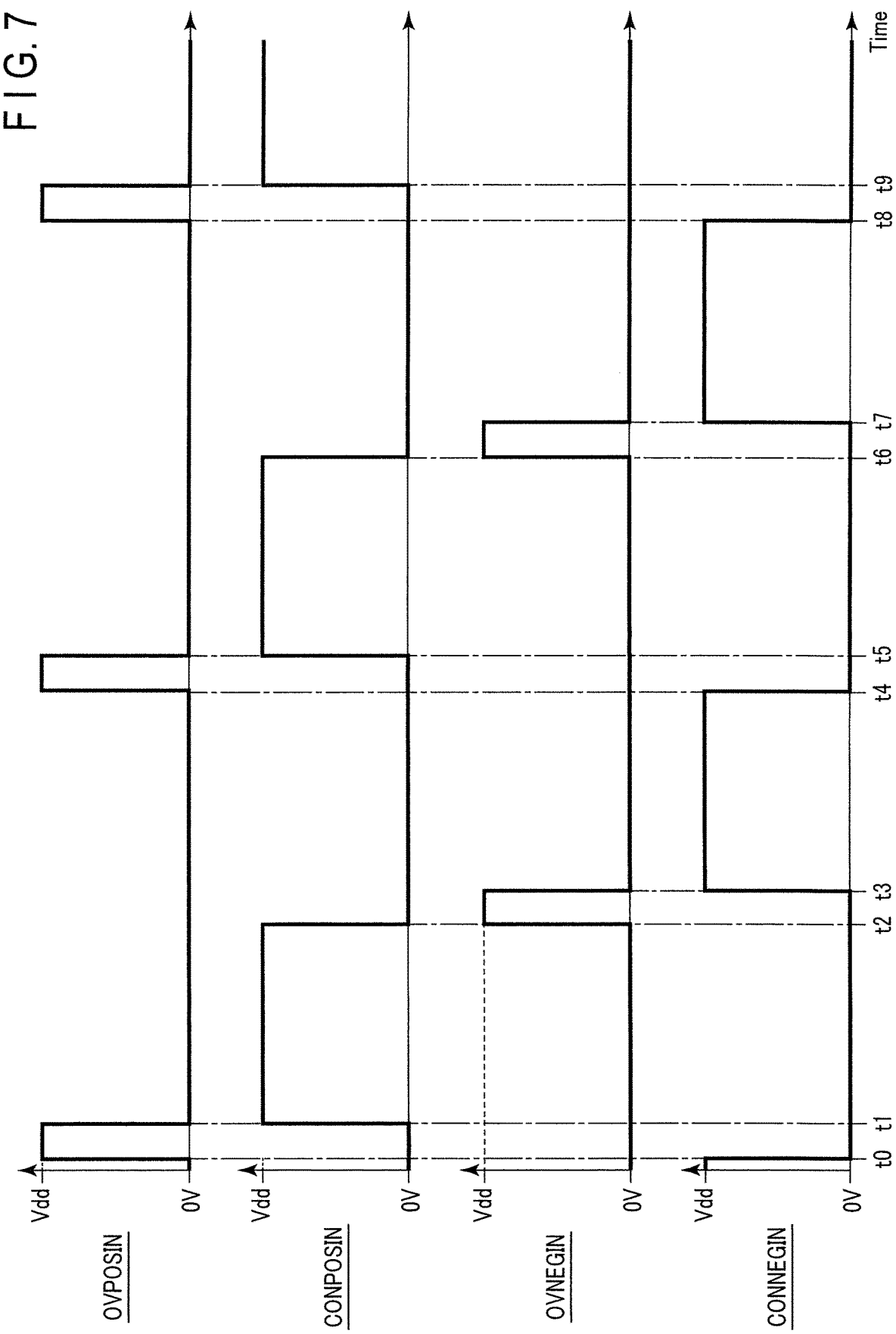
FIG. 7 is a timing chart for explaining the operation of the control circuit.

The operation of the light control device 10 configured as above will be described. FIG. 7 is a timing chart for explaining the operation of the control circuit 14. As described above, the control circuit 14 generates the signal OVPOSIN, signal CONPOSIN, signal OVNEGIN and signal CONNEGIN.

At time t0, the control circuit 14 sets signal OVPOSIN to the high level (e.g., voltage Vdd=5V). At time t1, the control circuit 14 sets signal OVPOSIN to the low level (for example, 0V) and sets signal CONPOSIN to the high level.

At time t2, the control circuit 14 sets signal CONPOSIN to the low level and sets signal OVNEGIN to the high level. At time t3, the control circuit 14 sets signal OVNEGIN to the low level and sets signal CONNEGIN to the high level.

At time t4, the control circuit 14 sets signal CONNEGIN to the low level and sets signal OVPOSIN to the high level. Times t0 to t4 define one cycle, and the same cycle is repeated thereafter.

Figure 8:
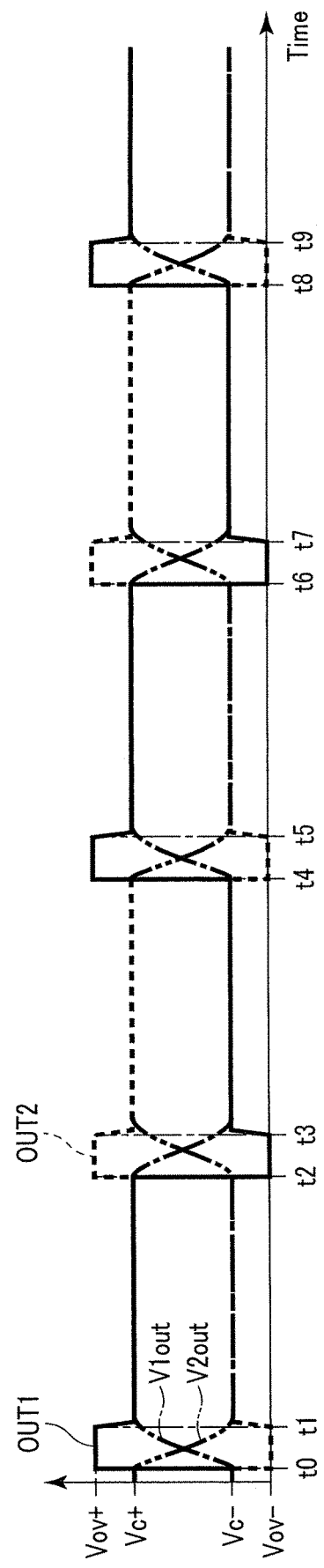
FIG. 8 is a timing chart for explaining the operation of the drive circuit according to the first embodiment.

FIG. 8 is a timing chart for explaining the operation of the drive circuit 12. Times t0 to t9 in FIG. 8 correspond to times t0 to t9 shown in FIG. 7. In FIG. 8, (1) drive voltage OUT1 which the drive circuit applies to terminal T1 of the light control element 11, (2) drive voltage OUT2 which the drive circuit 12 applies to terminal T2 of the light control element 11, (3) voltage V1out of the node N1 of the light control element 11 and (4) voltage V2out of the node N2 of the light control element 11 are shown. In FIG. 8, drive voltage OUT1 is indicated by a solid line, drive voltage OUT2 is indicated by a broken line, voltage V1out is indicated by a one-dot chain line, and voltage V2out is indicated by a two-dot chain line.

In the period t0 to t1, switching element 40 is turned on, and voltage OUT1 is set to Vov+. In the period t0 to t1, switching element 43 is turned on, and voltage OUT2 is set to Vov−. As a result, voltage V1out on the distal side rises faster than when control voltage Vc+ is applied to terminal T1. Further, voltage V2out on the distal side falls faster than when control voltage Vc− is applied to terminal T2.

In the period t1 to t2, switching element 45 is turned on, and voltage OUT1 is set to Vc+. In the period t1 to t2, switching element 46 is turned on, and voltage OUT2 is set to Vc−. As a result, voltage V1out on the distal side is set to control voltage Vc+, and voltage V2out on the distal side is set to control voltage Vc−.

In the period t2 to t3, switching element 41 is turned on, and voltage OUT1 is set to Vov−. In the period t2 to t3, switching element 42 is turned on, and voltage OUT2 is set to Vov+. As a result, voltage V1out on the distal side rises faster than when control voltage Vc− is applied to terminal T1. Further, voltage V2out on the distal side falls faster than when control voltage Vc+ is applied to terminal T2.

In the period t3 to t4, switching element 44 is turned on, and voltage OUT1 is set to Vc−. In the period t3 to t4, switching element 47 is turned on, and voltage OUT2 is set to Vc+. As a result, voltage V1out on the distal side is set to control voltage Vc−, and voltage V2out on the distal side is set to control voltage Vc+.

Thereafter, the same operation as in cycle t0 to t4 is repeated. The driving frequency is, for example, 20 Hz.

Note that the overdrive periods, that is, the period t0 to t1 and the period t2 to t3, are set in accordance with the load (resistance and capacitance) of the light control element 11. That is, the overdrive period is set shorter than the period during which voltage V1out on the distal side rises from control voltage Vc− to control voltage Vc+. In addition, the overdrive period is set shorter than the period during which voltage V2out on the distal side falls from control voltage Vc+ to control voltage Vc−.

Figure 9:
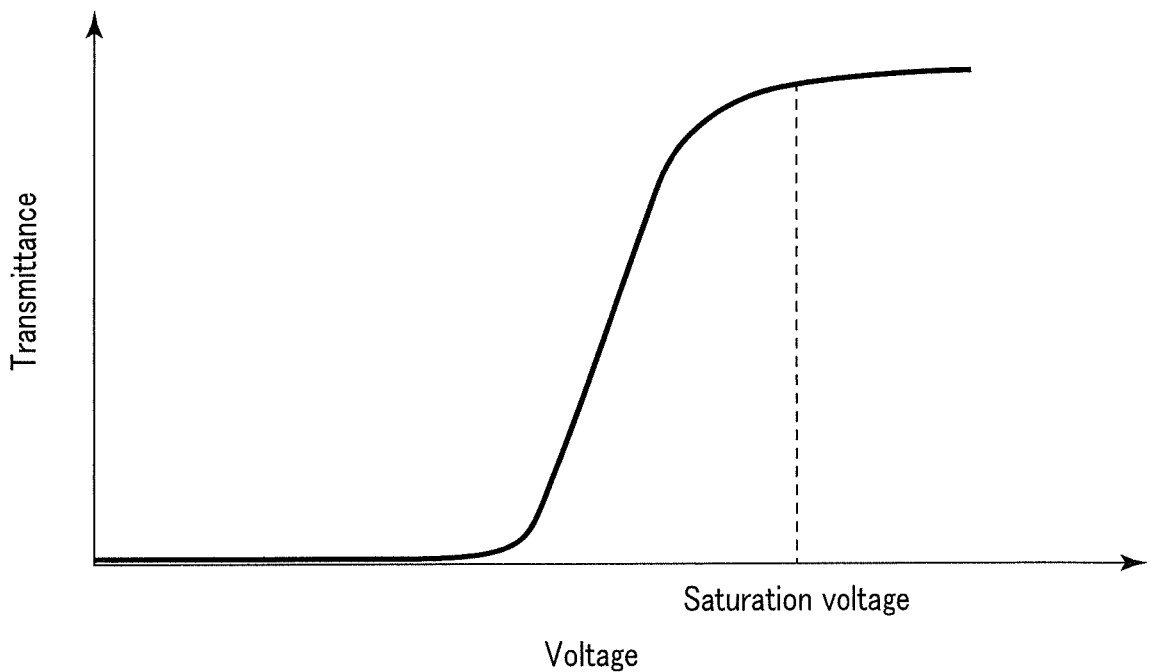
FIG. 9 is a graph showing an example of V-T characteristics of the light control element.

FIG. 9 is a graph showing an example of voltage-transmittance (V-T) characteristics of the light control element 11. In FIG. 9, the horizontal axis represents a voltage (V) while the vertical axis represents a transmittance (%), and both axes adopt arbitrary units. The voltage shown in FIG. 9 is a voltage applied to the liquid crystal layer 24, that is, a voltage applied between electrodes 22 and 23.

As can be understood from FIG. 9, the transmittance of the light control element 11 can be altered by changing the voltage (drive voltage) applied to the light control element 11. Even if a drive voltage equal to or higher than the saturation voltage is applied to the light control element 11, the transmittance does not change. The saturation voltage is a minimum voltage of the voltages that achieve the maximum transmittance. For example, the voltage "(Vc+)−(Vc−)" is set to be below the saturation voltage. Therefore, even if the overdrive voltage is set to a voltage equal to or higher than the saturation voltage within a range that does not exceed the withstand voltage of the liquid crystal, the light control element 11 can be driven using the overdrive voltage, without affecting the transmittance of the liquid crystal.

The effective voltages on the terminal side are substantially control voltages Vc+ and Vc−. Further, since the voltages on the distal side reach control voltages Vc+ and Vc− at a faster timing, the effective voltages on the distal side are also close to control voltages Vc+ and Vc−. As a result, the difference in the transmittance between the terminal side and the distal side is reduced, and the color unevenness can be reduced.

Further, in the polarity inversion period including the zero cross point (the point where voltage V1out and voltage V2out intersect) (for example, the period t0 to t1 in FIG. 8), the effective voltage applied to the liquid crystal is low, so that the transmittance of the liquid crystal is not a desired transmittance. In particular, at the zero cross point, the voltage applied to the liquid crystal is 0V. In this embodiment, however, overdriving is used, so that the voltage on the distal side rises at a faster timing. Accordingly, the polarity inversion period can be shortened, and the flicker can be reduced.

[3] COMPARATIVE EXAMPLE

Figure 10:
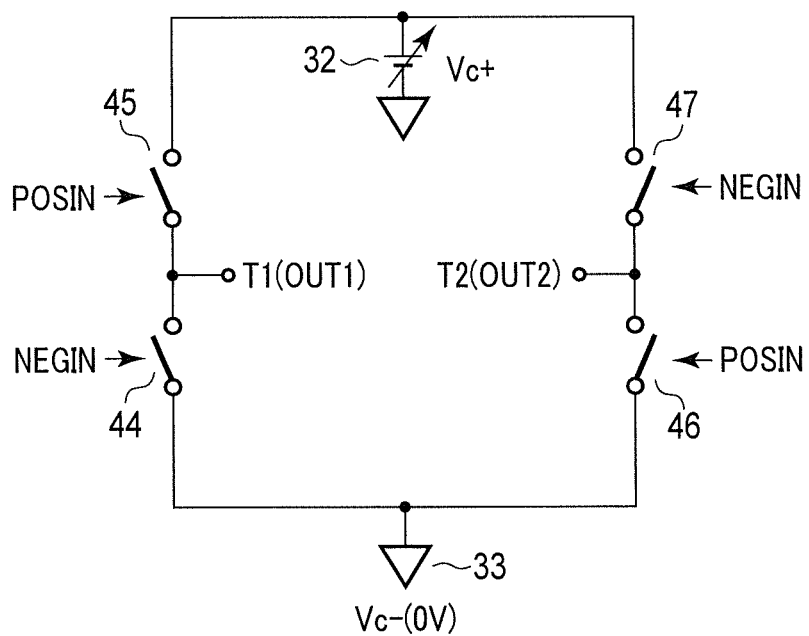
FIG. 10 is a circuit diagram of a drive circuit according to a comparative example.

Next, a light control device according to a comparative example will be described. FIG. 10 is a circuit diagram of a drive circuit according to a comparative example.

Voltage source 32 generates control voltage Vc+. Voltage source 33 generates control voltage Vc−. For example, Vc+=40V and Vc−=0V.

A first terminal of switching element 44 is connected to voltage source 33, a second terminal thereof is connected to terminal T1, and signal NEGIN is input to the control terminal. Switching element 44 is turned on when the signal NEGIN is at the high level, and is turned off when the signal NEGIN is at the low level.

A first terminal of switching element 45 is connected to voltage source 32, a second terminal thereof is connected to terminal T1, and signal POSIN is input to the control terminal. Switching element 45 is turned on when the signal POSIN is at the high level, and is turned off when the signal POSIN is at the low level.

A first terminal of switching element 46 is connected to voltage source 33, a second terminal thereof is connected to terminal T2, and signal POSIN is input to the control terminal. Switching element 46 is turned on when the signal POSIN is at the high level, and is turned off when the signal POSIN is at the low level.

A first terminal of switching element 47 is connected to voltage source 32, a second terminal thereof is connected to terminal T2, and signal NEGIN is input to the control terminal. Switching element 47 is turned on when the signal NEGIN is at the high level, and is turned off when the signal NEGIN is at the low level.

Figure 11:
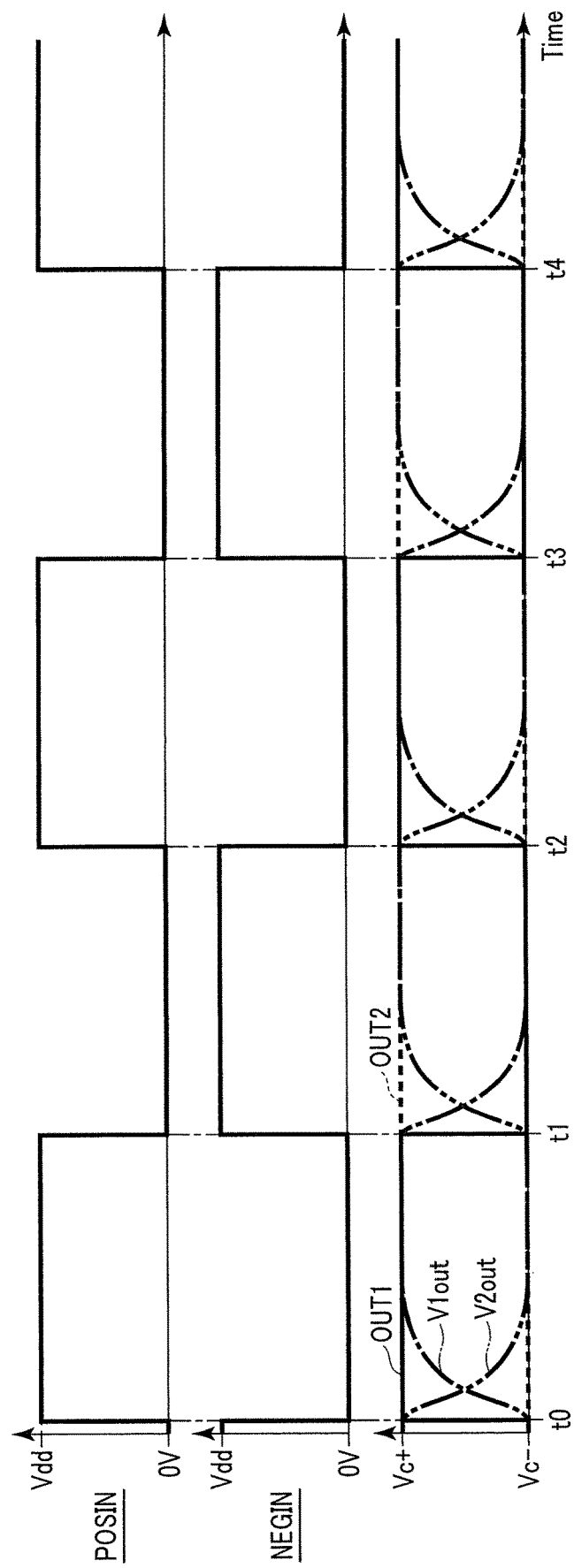
FIG. 11 is a diagram for explaining the operation of a light control device according to the comparative example.

FIG. 11 is a diagram for explaining the operation of the light control device according to the comparative example. At time t0, signal POSIN is set to the high level, and signal NEGIN is set to the low level. At time t1, signal POSIN is set to the low level, and signal NEGIN is set to the high level. At time t2, signal POSIN is set to the high level, and signal NEGIN is set to the low level.

In the period t0 to t1, switching element 45 is turned on, and voltage OUT1 is set to Vc+. In the period t0 to t1, switching element 46 is turned on, and voltage OUT2 is set to Vc−. As a result, voltage V1out on the distal side rises more slowly than in the overdrive driving. Further, voltage V2out on the distal side falls more slowly than in the overdrive driving.

In the period t1 to t2, switching element 44 is turned on, and voltage OUT1 is set to Vc−. In the period t1 to t2, switching element 47 is turned on, and voltage OUT2 is set to Vc+. As a result, voltage V1out on the distal side falls more slowly than in the overdrive driving. Further, voltage V2out on the distal side rises more slowly than in the overdrive driving.

In the comparative example, in the polarity inversion, a long time is required before voltage V1out and voltage V2out on the distal side reach the desired voltages (Vc+, Vc−). In the comparative example, therefore, flicker is inevitably conspicuous. Further, in the comparative example, the period in which the effective voltage differs between the terminal side and the distal side is long, so that color unevenness occurs.

[4] ADVANTAGES OF THE FIRST EMBODIMENT

As detailed above, in the first embodiment, the light control device 10 includes: base members 20 and 21 disposed to face each other; transparent electrodes 22 and 23 provided on the base members 20 and 21, respectively; a liquid crystal layer 24 filled between the transparent electrodes 22 and 23; a light control element that includes terminals T1 and T2 electrically connected to the transparent electrodes 22 and 23; and a drive circuit 12 that applies drive voltage OUT1 to terminal T1 and that applies drive voltage OUT2 having a polarity different from that of voltage OUT1 to terminal T2. Drive voltage OUT1 is set to positive side overdrive voltage Vov+ in the first period, is set to positive side control voltage Vc+ in the second period following the first period, is set to negative side overdrive voltage Vov− in the third period following the second period, and is set to negative side control voltage Vc− in the fourth period following the third period.

Therefore, according to the first embodiment, the voltage on the opposite side of the terminal side can be set to the control voltages Vc+ and Vc− more quickly. As a result, the transmittance difference between the terminal side and the distal side is reduced, and the color unevenness can be reduced.

Flicker may occur during the polarity inversion period including the zero cross point (the point where voltage V1out and voltage V2out intersect). In this embodiment, however, the polarity inversion period can be shortened, so that the flicker can be reduced.

Figure 12:
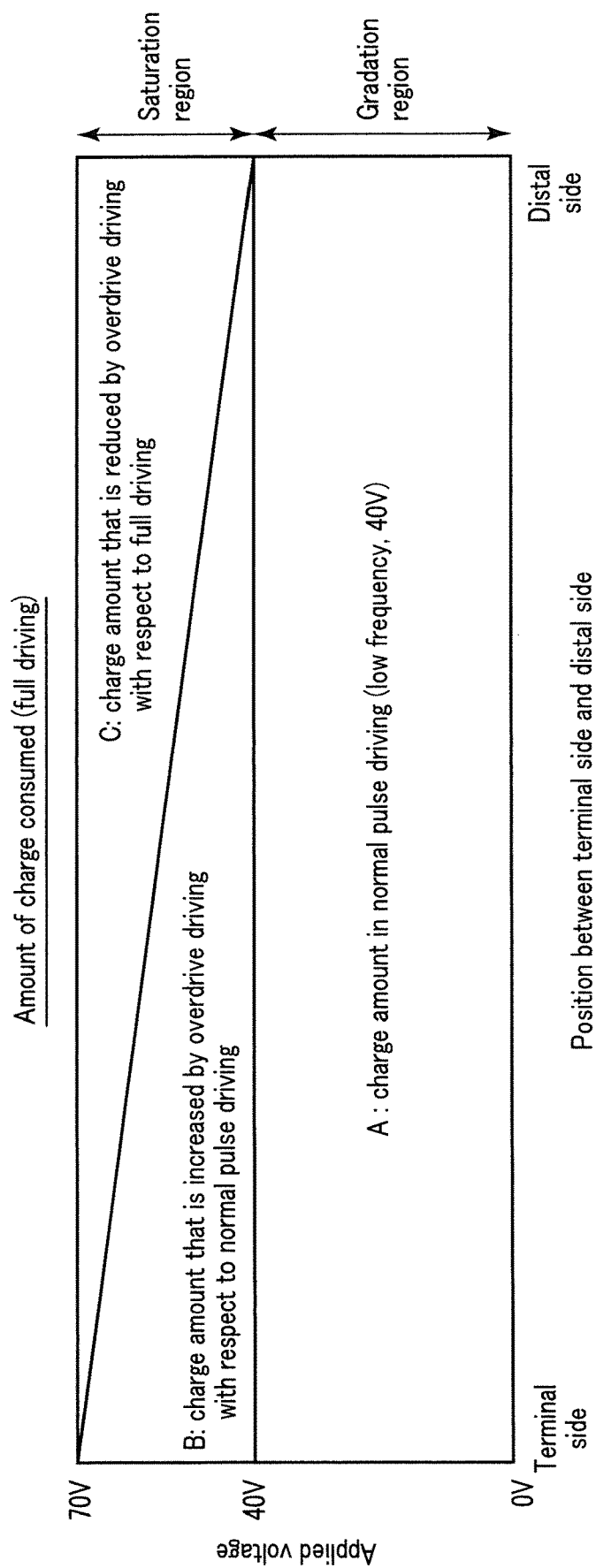
FIG. 12 is a schematic diagram of the amount of charge consumed according to the first example.

FIG. 12 is a schematic diagram of the amount of charge consumed according to the first example. In FIG. 12, the horizontal axis represents a position between the terminal and the distal end, and the vertical axis represents the voltage applied to the liquid crystal (applied voltage). For example, the region of 0V to 40V is a gradation region in which the transmittance can be changed, and the region of 40V to 70V is a saturation region in which the transmittance does not substantially change.

Charge amount A is a charge amount in the normal pulse driving. The normal pulse driving of the first example is an example in which the applied voltage is 40V and the frequency is lowered until the voltage on the distal side reaches 40V. In the normal pulse driving, the voltage on the distal side finally becomes 40V, so that color unevenness between the terminal side and the distal side can be reduced. However, since the time required for polarity inversion becomes longer, the flicker increases.

Charge amount B is a charge amount that is increased by the overdrive driving with respect to the normal pulse driving. The overdrive driving is an example in which driving is performed using an overdrive voltage of 70V. Since the voltage decreases from the terminal side to the distal side, the charge amount B is represented by a triangle that gradually decreases from the terminal side toward the distal side. Where the overdrive driving is performed, the flicker can be reduced and the color unevenness can be reduced as compared with the case where the normal pulse driving is performed, with only the charge amount B increased.

Charge amount C is a charge amount that is reduced by the overdrive driving with respect to the full driving. The full driving is an example in which driving is performed using 70V. That is, "charge amount A+ charge amount B+charge amount C" is a charge amount of the full driving. In the full driving, the flicker is reduced, but the amount of charge consumed increases. In the overdrive driving, the flicker can be reduced to the same extent as in the full driving, and the amount of charge consumed can be reduced as compared to the full driving.

Figure 13:
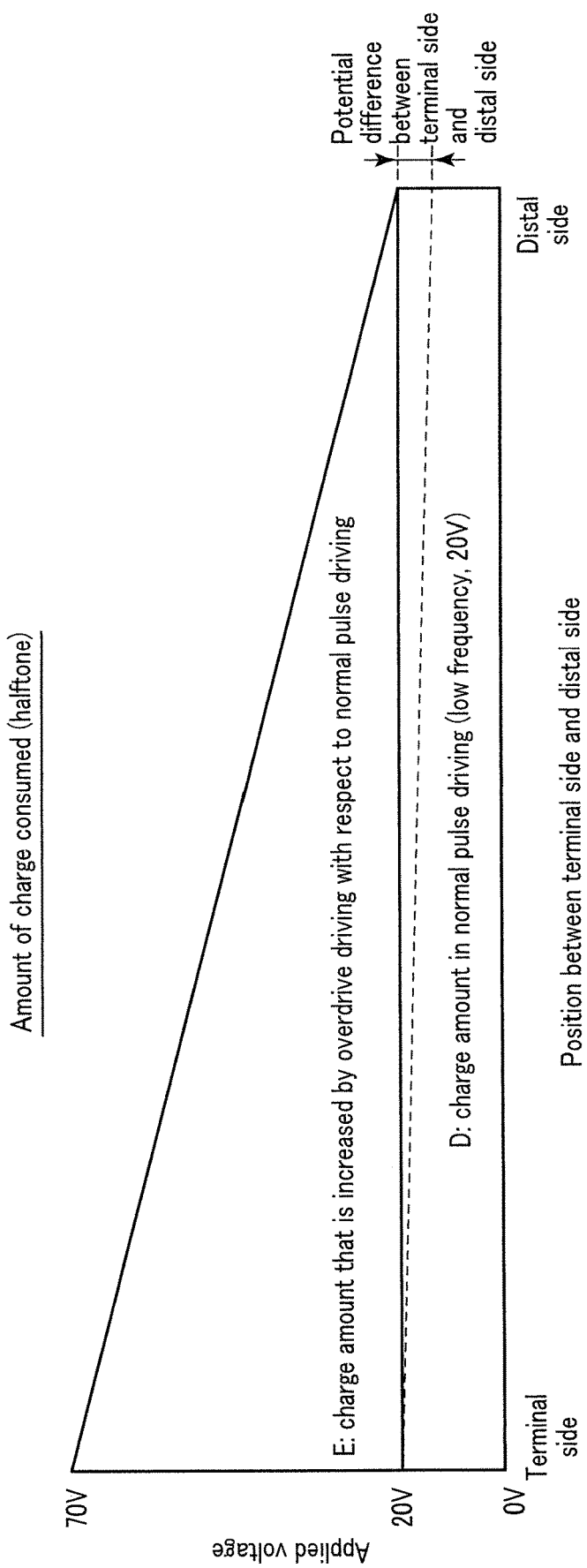
FIG. 13 is a schematic diagram of the amount of charge consumed according to the second example.

FIG. 13 is a schematic diagram of the amount of charge consumed according to the second example. The second example is an example in which halftone is executed.

Charge amount D is a charge amount in the normal pulse driving. The normal pulse driving of the second example is an example in which the applied voltage is 20V and the frequency is lowered until the voltage on the distal side reaches 20V. In the normal pulse driving, the voltage on the distal side finally becomes 20V, so that color unevenness between the terminal side and the distal side can be reduced. However, since the time required for polarity inversion becomes longer, the flicker increases. If the frequency is increased in order to reduce the flicker, the potential difference between the terminal side and the distal side increases, and color unevenness occurs. The amount of charge consumed when the frequency is increased is represented by a region that is lower than the broken line in FIG. 13. As can be seen, the color unevenness and the flicker have a trade-off relationship.

Charge amount E is a charge amount that is increased by the overdrive driving with respect to the normal pulse driving. Even when halftone is executed using overdrive driving, the flicker can be reduced and the color unevenness can be reduced as compared with the case where the normal pulse driving is performed with only the charge amount E increased. In the second example as well, the overdrive driving can reduce the flicker to the same extent as full driving of 70V.

Second Embodiment

The second embodiment is a specific configuration example of the drive circuit 12 and the power supply circuit 13. The second embodiment is an example in which the drive circuit 12 is configured in a digital manner using transistors.

Figure 14:
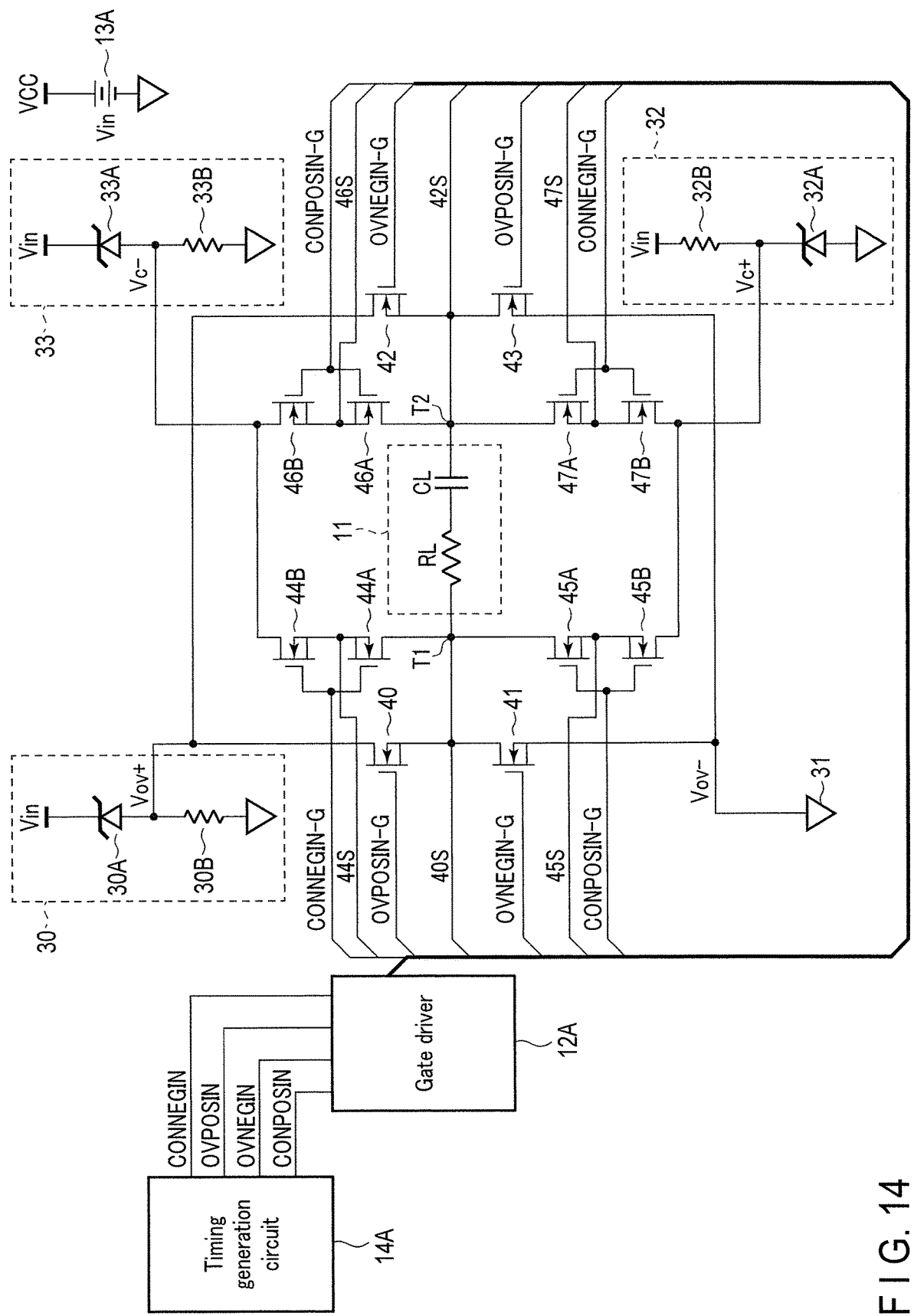
FIG. 14 is a circuit diagram mainly showing a drive circuit according to the second embodiment.

FIG. 14 is a circuit diagram mainly showing a drive circuit 12 according to the second embodiment of the present invention. In the present embodiment, each of the switching elements constituting the drive circuit 12 is configured by a MOS transistor or a bipolar transistor. In connection with the present embodiment, an example using an N-channel MOS transistor (or a power MOS transistor) will be described. If expressed as an equivalent circuit, the light control element 11 includes a resistive load RL and a capacitive load CL, as can be understood from FIG. 5.

The control circuit 14 includes a timing generation circuit 14A. The timing generation circuit 14A controls the timing of signal OVPOSIN, signal CONPOSIN, signal OVNEGIN and signal CONNEGIN.

The drive circuit 12 includes a gate driver 12A. The gate driver 12A receives the signal OVPOSIN, signal CONPOSIN, signal OVNEGIN and signal CONNEGIN from the timing generation circuit 14A. The gate driver 12A uses the signal OVPOSIN, signal CONPOSIN, signal OVNEGIN and signal CONNEGIN to set the levels of these signal to gate voltage levels optimum for transistors. As signals having the gate voltage levels optimal for transistors, the gate driver 12A generates a signal OVPOSIN-G, a signal CONPOSIN-G, a signal OVNEGIN-G and a signal CONNEGIN-G.

The drive circuit 12 includes N-channel MOS transistors 40 to 43, 44A, 44B, 45A, 45B, 46A, 46B, 47A and 47B. Signal lines 40S, 42S, 44S, 45S, 46S and 47S are connected to the gate driver 12A. The signal lines 40S, 42S, 44S, 45S, 46S and 47S provide the gate driver 12A with the source voltage levels of transistors in order to set the optimal gate voltage levels.

The drain of transistor 40 is connected to voltage source 30 that generates overdrive voltage Vov+, the source thereof is connected to terminal T1, and the gate thereof is supplied with signal OVPOSIN-G. The source of transistor 40 is connected to the gate driver 12A through signal line 40S.

The drain of transistor 41 is connected to terminal T1, the source thereof is connected to voltage source 31 that generates overdrive voltage Vov−, and the gate thereof is supplied with signal OVNEGIN-G.

The drain of transistor 42 is connected to voltage source 30, the source thereof is connected to terminal T2, and the gate thereof is supplied with signal OVNEGIN-G. The source of transistor 42 is connected to the gate driver 12A through signal line 42S.

The drain of transistor 43 is connected to terminal T2, the source thereof is connected to voltage source 31, and the gate thereof is supplied with signal OVPOSIN-G.

Transistors 44A and 44B constitute switching element 44 shown in FIG. 6. The drain of transistor 44A is connected to terminal T1, the source thereof is connected to the source of transistor 44B, and the gate thereof is supplied with signal CONNEGIN-G. The drain of transistor 44B is connected to voltage source 33 that generates control voltage Vc−, and the gate thereof is supplied with signal CONNEGIN-G. The source of transistor 44A is connected to the gate driver 12A through signal line 44S.

Transistors 45A and 45B constitute switching element 45 shown in FIG. 6. The drain of transistor 45A is connected to terminal T1, the source thereof is connected to the source of transistor 45B, and the gate thereof is supplied with signal CONPOSIN-G. The drain of transistor 45B is connected to voltage source 32 that generates control voltage Vc+, and the gate thereof is supplied with signal CONPOSIN-G. The source of transistor 45A is connected to the gate driver 12A through signal line 45S.

Transistors 46A and 46B constitute switching element 46 shown in FIG. 6. The drain of transistor 46A is connected to terminal T2, the source thereof is connected to the source of transistor 46B, and the gate thereof is supplied with signal CONPOSIN-G. The drain of transistor 46B is connected to the voltage source 33, and the gate thereof is supplied with signal CONPOSIN-G. The source of transistor 46A is connected to the gate driver 12A through signal line 46S.

Transistors 47A and 47B constitute switching element 47 shown in FIG. 6. The drain of transistor 47A is connected to terminal T2, the source thereof is connected to the source of transistor 47B, and the gate thereof is supplied with signal CONNEGIN-G. The drain of transistor 47B is connected to voltage source 32, and the gate thereof is supplied with signal CONNEGIN-G. The source of transistor 47A is connected to the gate driver 12A through signal line 47S.

The power supply circuit 13 includes a voltage source 13A and voltage sources 30 to 33. Voltage source 13A generates voltage Vin from the power supply voltage VCC.

Voltage source 30 includes a Zener diode (constant voltage diode) 30A as a constant voltage element, and includes a resistor (resistive element) 30B. The cathode of the Zener diode 30A is connected to voltage source 13A, and the anode thereof is connected to one end of the resistor 30B. The other end of the resistor 30B is connected to the ground terminal GND. Voltage source 30 may adopt other configurations. For example, where a voltage to be used is high, two or more Zener diodes may be connected in series. Alternatively, an NPN transistor for current amplification may be added to a connection node between the Zener diode 30A and the resistor 30B. Further, voltage source 30 may be configured by a series regulator having a voltage control terminal. Further, voltage source 30 may be constituted by a DC/DC converter.

Voltage source 32 includes a Zener diode 32A and a resistor 32B. One end of the resistor 32B is connected to voltage source 13A, and the other end thereof is connected to the cathode of Zener diode 32A. The anode of Zener diode 32A is connected to a ground terminal GND. Voltage source 32 may use another configuration similar to the configuration of voltage source 30.

Voltage source 33 includes a Zener diode 33A and a resistor 33B. The cathode of Zener diode 33A is connected to voltage source 13A, and the anode thereof is connected to one end of the resistor 33B. The other end of the resistor 33B is connected to the ground terminal GND. Voltage source 33 may use another configuration similar to the configuration of voltage source 30.

As detailed above, in the second embodiment, the drive circuit 12 can be configured using transistors. The voltage control in the second embodiment is similar to that performed in the first embodiment. The other advantages are similar to the advantages of the first embodiment.

Third Embodiment

The third embodiment is a specific configuration example of the drive circuit 12 and the power supply circuit 13. The third embodiment is an example in which the drive circuit 12 is configured in an analog manner using power amplifiers.

Figure 15:
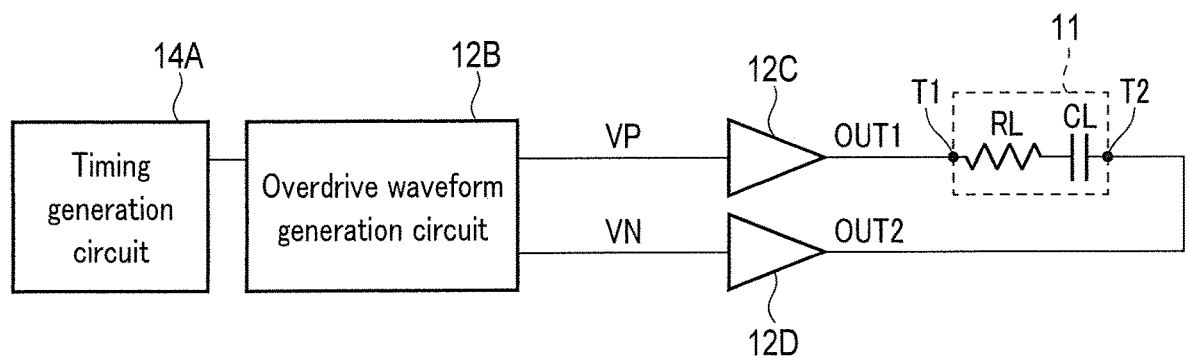
FIG. 15 is a circuit diagram mainly showing a drive circuit according to the third embodiment.

FIG. 15 is a circuit diagram mainly showing a drive circuit 12 according to the third embodiment of the present invention. The drive circuit 12 includes an overdrive waveform generation circuit 12B and power amplifiers 12C and 12D. The overdrive waveform generation circuit 12B generates a positive voltage waveform VP and a negative voltage waveform VN, using control signals from the timing generation circuit 14A.

Power amplifiers 12C and 12D can perform four-quadrant output capable of performing first quadrant to fourth quadrant operations. That is, power amplifiers 12C and 12D can perform current supply (source) and current absorption (sink) regardless of the direction of the voltage.

Power amplifier 12C receives a positive voltage waveform VP from the overdrive waveform generation circuit 12B and amplifies this positive voltage waveform VP. Power amplifier 12C outputs drive voltage OUT1. The drive voltage OUT1 is applied to terminal T1 of the light control element 11.

Power amplifier 12D receives a negative voltage waveform VN from the overdrive waveform generation circuit 12B and amplifies this negative voltage waveform VN. Power amplifier 12D outputs drive voltage OUT2. The drive voltage OUT2 is applied to terminal T2 of the light control element 11.

Figure 16:
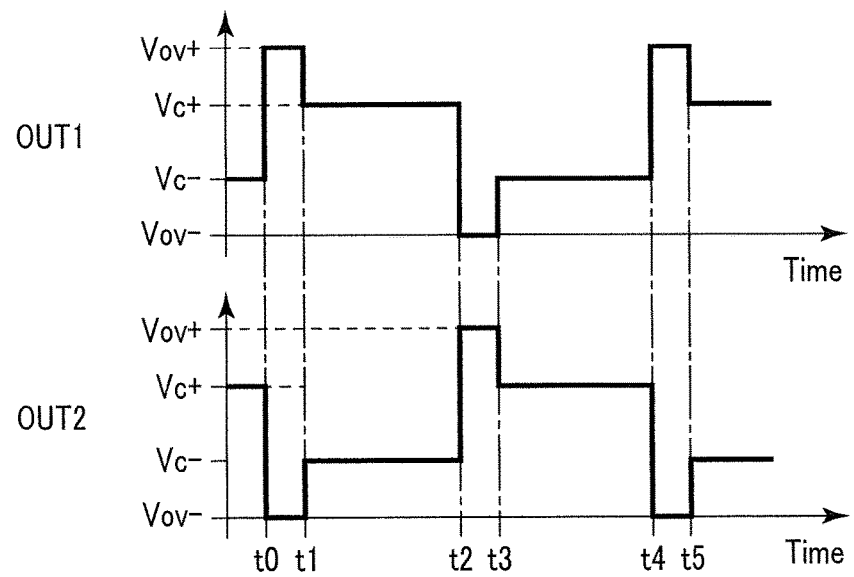
FIG. 16 is a timing chart for explaining the operation of the drive circuit according to the third embodiment.

FIG. 16 is a timing chart for explaining the operation of the drive circuit 12. Drive voltages OUT1 and OUT2 have similar waveforms to those shown in FIG. 8 in connection with the first embodiment. Drive voltage OUT1 has a similar waveform to that of the positive voltage waveform VP in the previous stage, except that the output current is amplified. Drive voltage OUT2 has a similar waveform to that of the negative voltage waveform VN in the previous stage, except that the output current is amplified.

According to the third embodiment, overdrive driving can be realized in an analog manner. The other advantages are similar to the advantages of the first embodiment.

EXAMPLES

In the embodiments described above, the liquid crystal element (light control element) using PDLC or PNLC has been described as an example; however, the present invention is not limited to this. The liquid crystal element used as a light control element may have a configuration in which polarizing plates and alignment films are disposed on both sides of a liquid crystal layer, and may employ a TN (Twisted Nematic) method, a VA (Vertical Alignment) method, an IPS (In-Plane Switching) method, etc. In addition, other than the liquid crystal element, various types of electro-optical elements in which the refractive index changes with voltage can be used as the light control element.

Other than the MOS transistor or bipolar transistor, the switching elements described in connection with the above embodiments may be formed of a SiC-MOSFET using silicon carbide (SiC) for a semiconductor layer, a GaN-MOSFET using gallium nitride (GaN) for a semiconductor layer, etc.

The light control device described in the above embodiments is applicable to windows and indoor partitions in homes, offices or public facilities, image projection screens and signage in commercial facilities or event venues, windows and sunroofs in automobiles or aircrafts, etc.

In the above embodiments, the light control element has been described as an example of the liquid crystal element. However, the present invention is not limited to this, and the driving method described in connection with the above embodiments is applicable to various devices (including a liquid crystal display device) using a liquid crystal.

The present invention is not limited to the embodiment described above, and can be modified variously modified in the implementation stage without departing from the scope of the invention. In addition, the embodiments may be suitably implemented in combination, in which case a combined effect is obtained. Furthermore, inventions in various stages are included in the above-described embodiments, and various inventions can be extracted by a combination selected from a plurality of the disclosed configuration requirements. For example, even if some configuration requirements are removed from all of the configuration requirements shown in the embodiments, the problem described in the column of the problem to be solved by the invention can be solved, and if an effect described in the column of the effect of the invention is obtained, a configuration from which this configuration requirement is removed can be extracted as an invention.

The invention claimed is:
1. A light control device comprising:
a light control element including
first and second base members,
first and second electrodes respectively provided on the first and second base members,
a liquid crystal layer filled between the first and second electrodes, and
first and second terminals electrically connected to the first and second electrodes; and
a drive circuit that applies a first drive voltage to the first terminal and applies a second drive voltage having a polarity different from that of the first drive voltage to the second terminal,
wherein the first drive voltage
is set to a first voltage in a first period,
is set to a second voltage lower than the first voltage in a second period following the first period,
is set to a third voltage lower than the second voltage in a third period following the second period, and
is set to a fourth voltage lower than the second voltage and higher than the third voltage in a fourth period following the third period.
2. The light control device according to claim 1, wherein a voltage difference between the first voltage and the third voltage is smaller than a withstand voltage of the light control element.

3. The light control device according to claim 1, wherein a voltage difference between the second voltage and the fourth voltage is equal to or less than a saturation voltage of the light control element.

4. The light control device according to claim 1, wherein the drive circuit includes first to eighth switching elements,
the first switching element is connected between a first voltage source that generates the first voltage and the first terminal,
the second switching element is connected between a third voltage source that generates the third voltage and the first terminal,
the third switching element is connected between the first voltage source and the second terminal,
the fourth switching element is connected between the third voltage source and the second terminal,
the fifth switching element is connected between a second voltage source that generates the second voltage and the first terminal,
the sixth switching element is connected between a fourth voltage source that generates the fourth voltage and the first terminal,
the seventh switching element is connected between the second voltage source and the second terminal, and
the eighth switching element is connected between the fourth voltage source and the second terminal.

5. The light control device according to claim 4, further comprising:
a control circuit that generates first to fourth control signals,
wherein the first control signal is input to the first and fourth switching elements,
the second control signal is input to the second and third switching elements,
the third control signal is input to the fifth and eighth switching elements, and
the fourth control signal is input to the sixth and seventh switching elements.

6. The light control device according to claim 5, wherein the first control signal is activated in the first period,
the third control signal is activated in the second period,
the second control signal is activated in the third period, and
the fourth control signal is activated in the fourth period.

7. The light control device according to claim 4, wherein each of the first to fourth voltage sources includes a constant voltage element.

8. The light control device according to claim 4, wherein each of the first to eighth switching elements includes a transistor.

* * * * *